(12) United States Patent
Hara

(10) Patent No.: US 7,440,829 B2
(45) Date of Patent: Oct. 21, 2008

(54) STEERING ANGLE ESTIMATING APPARATUS FOR VEHICLE

(75) Inventor: Takeshi Hara, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 214 days.

(21) Appl. No.: 10/573,416

(22) PCT Filed: Sep. 14, 2004

(86) PCT No.: PCT/JP2004/013711

§ 371 (c)(1),
(2), (4) Date: Mar. 27, 2006

(87) PCT Pub. No.: WO2005/031256

PCT Pub. Date: Apr. 7, 2005

(65) Prior Publication Data

US 2007/0083308 A1    Apr. 12, 2007

(30) Foreign Application Priority Data

Sep. 25, 2003    (JP) .............................. 2003-332625

(51) Int. Cl.
*A01B 69/00* (2006.01)
(52) U.S. Cl. .............................. 701/41; 701/42; 701/71; 701/82
(58) Field of Classification Search .................. 701/1, 701/36, 41–43, 70–75, 82–91; 180/441–446, 180/410
See application file for complete search history.

(56) References Cited

U.S. PATENT DOCUMENTS 7,295,908 B2 * 11/2007 Goto et al. .................. 701/43
7,302,328 B2 * 11/2007 Kato et al. .................. 701/41

FOREIGN PATENT DOCUMENTS

| JP | 3-182862 A | 8/1991 |
| JP | 4-79260 U | 7/1992 |
| JP | 4-310864 A | 11/1992 |
| JP | 2614348 B2 | 2/1997 |
| JP | 9-178464 A | 7/1997 |
| JP | 2002-145095 A | 5/2002 |
| JP | 2003-14450 A | 1/2003 |

OTHER PUBLICATIONS

Sakaj Shin-Ichiro, et al., "Novel Wheel Skid Detection Method without Chassis Velocity for Electric Vehicle", T. ISS, 2000, pp. 281-287, vol. 120-D, No. 2.

* cited by examiner

*Primary Examiner*—Richard M. Camby
(74) *Attorney, Agent, or Firm*—Sughrue Mion, PLLC

(57) ABSTRACT

The present invention provides a steering angle estimating apparatus for vehicle that can accurately determine a steady state at all the steering angles, and can estimate the steering angle as much as possible even in a non-steady state. In the steering angle estimating apparatus for vehicle that has wheel rotational velocity sensors for four wheels, respectively, and estimates the steering angle of the vehicle based on wheel rotational velocities from the wheel rotational velocity sensors, relationships in the wheel rotational velocities between respective combinations of two wheels of the front and rear wheels on right and left sides are compared so that slip of the four wheels is detected.

7 Claims, 3 Drawing Sheets

STEERING ANGLE ESTIMATING APPARATUS FOR VEHICLE

TECHNICAL FIELD

The present invention relates to a steering angle estimating apparatus for vehicle that estimates a steering angle of a vehicle using a steering wheel rotational velocity of the vehicle, and an electric power steering apparatus containing the estimating apparatus.

BACKGROUND ART

A conventional steering angle estimating apparatus for vehicle is disclosed in, for example, Japanese Patent No. 2614348 B2 (document 1). The estimating apparatus has a steering angle detecting sensor that detects a steering angle of a steering wheel, a left wheel velocity sensor that detects a velocity of the left wheels, a right wheel velocity sensor that detects a velocity of the right wheels, an estimated steering angle calculating means that calculates an estimated steering angle based on the velocity of the left wheels obtained by the left wheel velocity sensor and the velocity of the right wheels obtained by the right wheel velocity sensor, and a neutral position calculating means that calculates a neutral position of the steering angle of the steering wheel after a phase difference between a signal from the steering angle detecting sensor and the estimated steering angle obtained by the estimated steering angle calculating mean is taken into consideration.

Further, Japanese Patent Application Laid-Open No. 2003-14450 A (document 2) discloses a steering angle estimating apparatus for vehicle, which estimates a steering angle of a vehicle using a pair of rotating sensors which detect rotating states of the right and left wheels, having: a velocity detecting means that detects rotational velocities of the right and left wheels based on outputs from the paired rotating sensors; a velocity ratio calculating means that calculates a rotational velocity ratio of the rotational velocity of the left wheels to the rotational velocity of the right wheels detected by the velocity detecting means; a steering angle calculating means that calculates the steering angle of the vehicle based on the rotational velocity ratio calculated by the velocity ratio calculating means.

In document 3 (Journal of the Institute of Electrical Engineers of Japan, vol. 120, No. 2 "New tire slipping detecting method which does not require vehicle velocity information in electronic vehicle", 2000), a motion equation of wheels and a motion equation of a vehicle body are obtained so that a slip ratio is estimated by using wheel velocities and a vehicle velocity as state variables.

However, with the technique in the document 1, only a neutral point of steering is estimated, and thus an estimation possible range is narrow. Since only a velocity of one set of the right wheel and left wheel is used for the estimation, accurate estimation cannot be made.

Since the estimating apparatus in the document 2 determines a steady state by comparing a rotational velocity ratio of two front wheels with a rotational velocity ratio of two rear wheels, a difference in turning radius between the front wheels and the rear wheels is not accurately reflected, and thus the above steady determination accuracy is not occasionally exact according to the steering angle. When only one wheel slips, the steering angle cannot be estimated.

Further, in the technique in the document 3, a torque for driving the tires should be detected, and motor driving is necessary or a driving torque sensor is necessary.

The present invention is devised in view of the above problems, and it is an object of the present invention to provide a steering angle estimating apparatus for vehicle that can accurately determine the steady state at all steering angles, and can estimate the steering angle as much as possible even in the case of a non-steady state such that one wheel slips. Its another object is to provide an electric power steering apparatus which contains the steering angle estimating apparatus for vehicle which can accurately determine the steady state at all the steering angles and can estimate the steering angle as much as possible even in a case where the steady state is not obtained.

DISCLOSURE OF THE INVENTION

The present invention relates to a steering angle estimating apparatus for vehicle that has wheel rotational velocity sensors for four wheels, respectively, and estimates a steering angle of a vehicle based on wheel rotational velocities from the wheel rotational velocity sensors, and the object of the present invention is achieved by comparing relationships in the wheel rotational velocities between two combinations of front and rear wheels on right and left sides and detecting that slip of the four wheels is detected.

Further, the object of the present invention is achieved more effectively by that when the two combinations of the front and rear wheels on the right and left sides match with each other, even if one of the four wheels slips, this wheel is specified and the correct steering angle can be estimated.

BEST MODE FOR CARRYING OUT THE INVENTION

Figure 1:
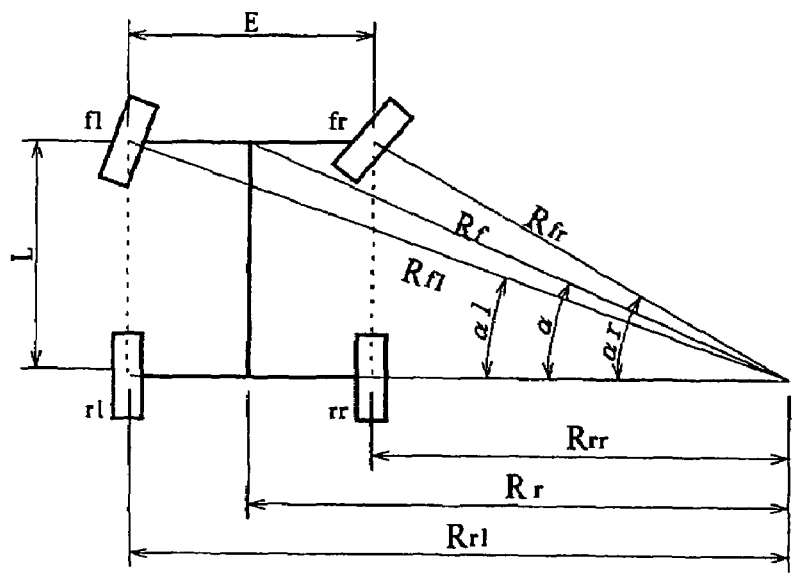
FIG. 1 is a diagram explaining a principle of the present invention.

As shown in FIG. 1, in the present invention, turning radiuses of four wheels fl, fr, rl and rr are respectively designated by Rfl, Rfr, Rrl and Rrr, steering angles of the front wheels fl and fr are respectively designated by $\alpha_{fl}$ and $\alpha_{fr}$, an axle distance of a vehicle is designated by L, and a vehicle width is designated by E. A turning radius of the center of the front wheel axle is designated by Rf, and a turning radius of the center of the rear wheel axle is designated by Rr. When wheel velocities (wheel angular velocities) of the left front wheel fl, the right front wheel fr, the left rear wheel rl and the right rear wheel rr are respectively designated by $\omega_{fl}$, $\omega_{fr}$, $\omega_{rl}$ and $\omega_{rr}$, it is known that the steering angle $\alpha$ of the center of the vehicle body and the wheel velocities $\omega_{fl}$, $\omega_{fr}$, $\omega_{rl}$, and $\omega_{rr}$ establish the following relationships:

$$\alpha_{front} = \frac{1}{2}\arcsin\left\{\frac{4L}{E}\left(\frac{\omega_{fl} - \omega_{fr}}{\omega_{fl} + \omega_{fr}}\right)\right\} \quad \text{[Mathematical formula 1]}$$

-continued $$\alpha_{rear} = \arctan\left\{\frac{2L}{E}\left(\frac{\omega_{rl} - \omega_{rr}}{\omega_{rl} + \omega_{rr}}\right)\right\}$$ [Mathematical formula 2]

According to any one of the mathematical formulas 1 and 2, the steering angle α is uniformly obtained from the vehicle velocities $\omega_{fl}$, $\omega_{fr}$, $\omega_{rl}$ and $\omega_{rr}$. That is to say, the steering angle α can be estimated. Further, the front and rear wheels on the right and left sides and the steering angles $\alpha_l$ and $\alpha_r$ on the right and left sides establish the following relationships:

$$\frac{\omega_{rl}}{\omega_{fl}} = \cos\alpha_l$$ [Mathematical formula 3]

$$\frac{\omega_{rr}}{\omega_{fr}} = \cos\alpha_r$$ [Mathematical formula 4]

Figure 2:
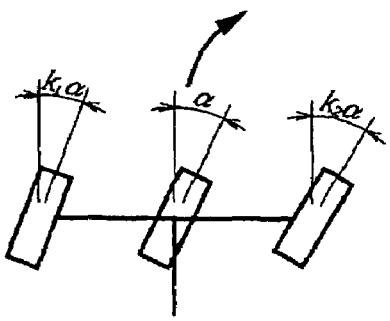
FIG. 2 is a diagram explaining a steering angle.

The relationships among the steering angle α of the center of the front wheel axle, the steering angle $\alpha_l$ of the left front wheel and the steering angle $\alpha_r$ of the right front wheel is determined by a vehicle type. If they establish the following mathematical formulas 5 and 6, the mathematical formulas 1 to 4 hold by the common steering angle α, axle distance L of the vehicle and vehicle width E. As shown in FIG. 2, k1 designates a ratio of the steering angle to a steering angle of an inner ring, and k2 designates a ratio of the steering angle to a steering angle of an outer ring.

At the time of left-hand turn, $\alpha_l = k1 \cdot \alpha$ $\alpha_r = k2 \cdot \alpha$ [Mathematical Formula 5]

At the time of right-hand turn, $\alpha_l = k2 \cdot \alpha$ $\alpha_r = k1 \cdot \alpha$ [Mathematical Formula 6]

Figure 3:
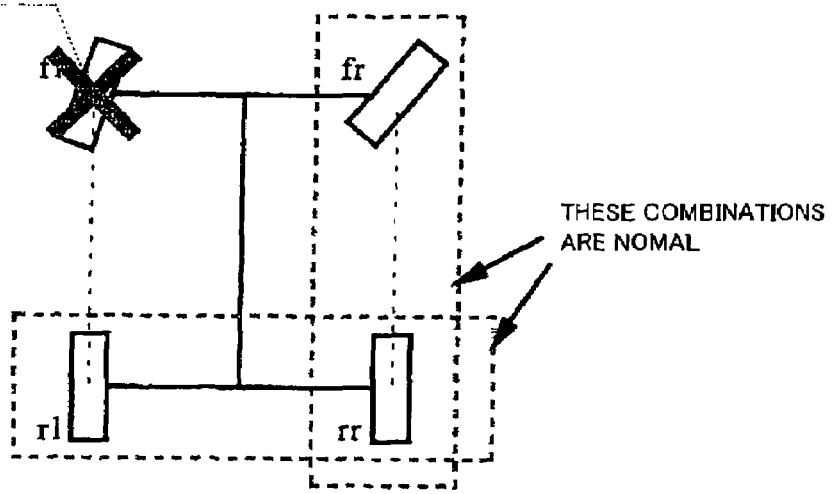
FIG. 3 is a diagram illustrating an example of slipping wheel.

When the vehicle can be turned in a steady state, the wheel velocities $\omega_{fl}$, $\omega_{fr}$, $\omega_{rl}$ and $\omega_{rr}$ establish all the mathematical formulas 1 to 4, but when a wheel slips, a mathematical formula which does not establish these mathematical formulas holds. Since this mathematical formula contains a wheel which slips, all the mathematical formulas 1 to 4 are checked so that the slipped wheel can be specified (excluding the case where two or more wheels slip). For example, in the case where the relationship between the rear wheels and the right front wheel is appropriate, as shown in FIG. 3, a determination can be made that only the left front wheel slips. Since one wheel starts to slip in most cases, the present invention is a method which is sufficient for specifying the wheel which slips first.

Figure 4:
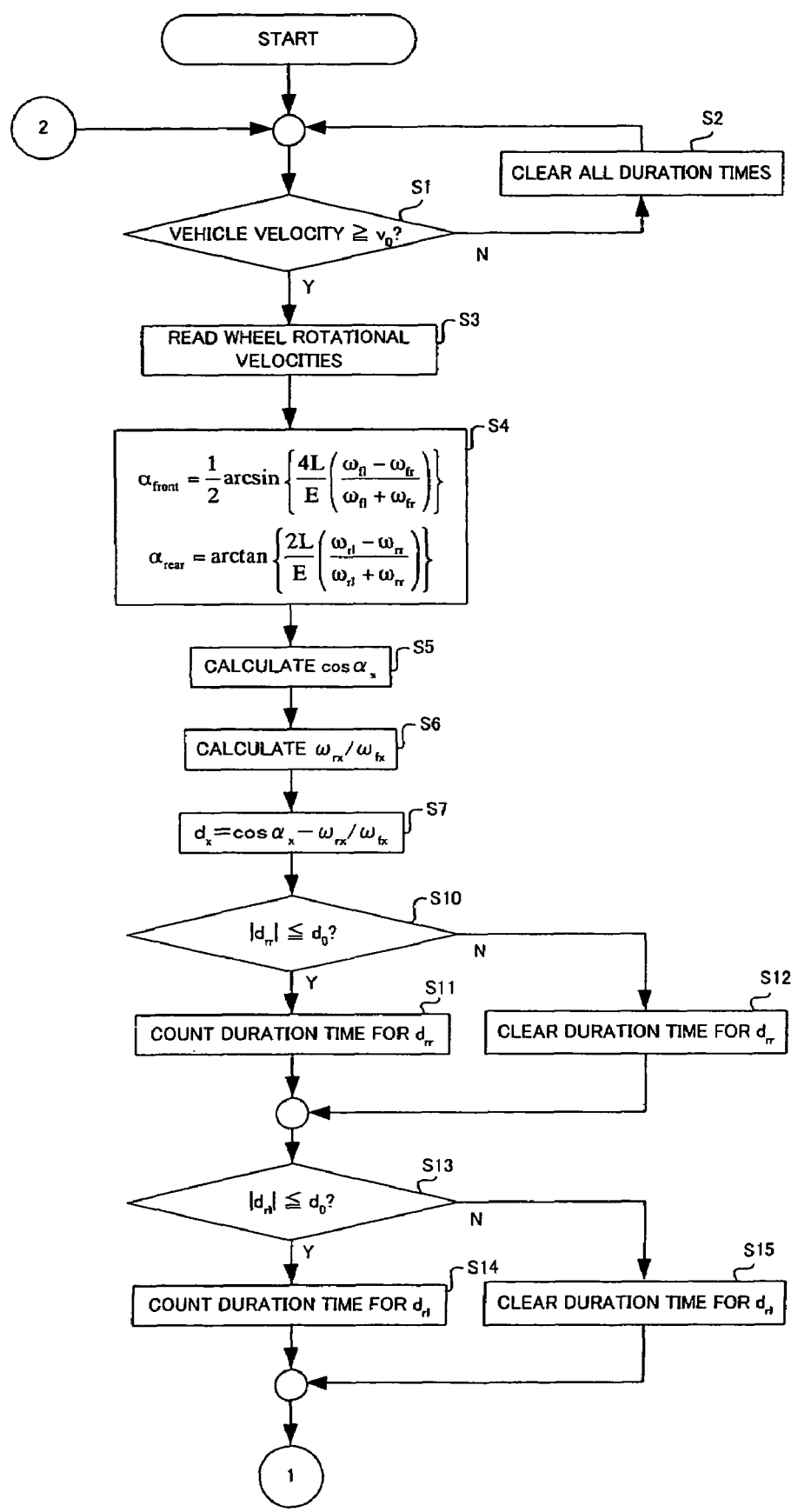
FIG. 4 is a part of a flowchart illustrating an operation example of the present invention.
Figure 5:
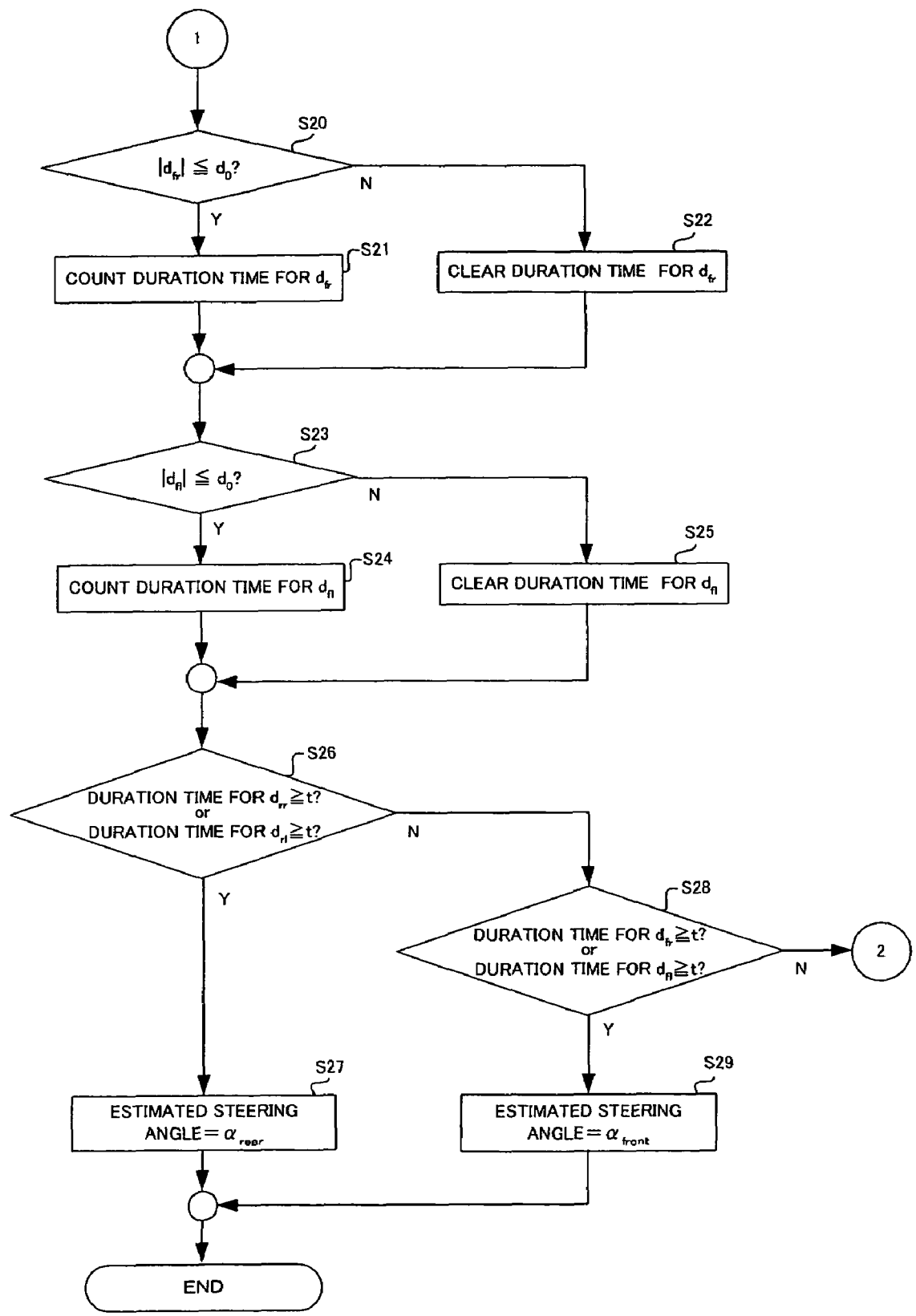
FIG. 5 is a part of a flowchart illustrating the operation example of the present invention.

FIGS. 4 and 5 show flowcharts of the estimating calculation and the present invention is explained. In the present invention, a vehicle is constituted so that all the four wheels are equipped with a wheel rotational velocity sensor that detects a rotational velocity of a wheel.

After the vehicle repeats an operation for clearing all duration times (Step S2) for which a condition is satisfied until the vehicle is accelerated to a predetermined velocity $v_0$ (Step S1), when the wheels reach the predetermined velocity $v_0$, the rotational velocities $\omega_{fl}$, $\omega_{fr}$, $\omega_{rl}$ and $\omega_{rr}$ of the wheels are read from the wheel rotational velocity sensors (Step S3). The rotational velocities $\omega_{fl}$ and $\omega_{fr}$ of the front wheels, and the rotational velocities $\omega_{rl}$ and $\omega_{rr}$ of the rear wheels are used so that the estimated steering angles $\alpha_{front}$ and $\alpha_{rear}$ are calculated according to the mathematical formulas 1 and 2 (Step S4).

A determination is made whether the right wheels or the left wheels are inner rings or outer rings based on the estimated steering angles $\alpha_{front}$ and $\alpha_{rear}$, the ratio k1 of the preset steering angle to the steering angle of the inner rings is multiplied by the ratio k2 of the steering angle to the steering angle of the outer ring, and the steering angle $\alpha_l$ of the left wheels and the steering angle $\alpha_r$ of the right angles are estimated so that their cosine values are calculated (Step S5, cos $\alpha_{fl}$ and cos $\alpha_{fr}$ from the front wheels, and cos $\alpha_{rl}$ and cos $\alpha_{rr}$ from the rear wheels). The steering angles of the inner and outer rings may be estimated not by a determination at the time of right-hand turn and left-hand turn and the multiplication of the coefficients (k1 and k2) but by a data table about the steering angles which is prepared. Further, a data table for obtaining cosine values of the inner and outer rings directly based on the steering angle a of the center of the front wheel axle may be utilized.

The rotational ratios of the front wheels to the rear wheels $\omega_{rl}/\omega_{fl}$ and $\omega_{rr}/\omega_{fr}$ are calculated based on the wheel rotational velocities $\omega_{fl}$, $\omega_{fr}$, $\omega_{rl}$ and $\omega_{rr}$ of the front and rear wheels on the right and left sides (Step S6), so that the calculated rotational ratios are compared with the cosine values cos$\alpha_{fl}$, cos $\alpha_{fr}$, cos $\alpha_{rl}$ and cos $\alpha_{rr}$ (Step S7). That is to say, the following mathematical formula 7 is operated. x designates l for left or r for right.

$$d_x = \cos\alpha_x - \omega_{rx}/\omega_{fx}$$ [Mathematical Formula 7]

An absolute value $|d_x|$ of a difference $d_x$ obtained according to the mathematical formula 7, namely, the absolute values $|d_{fl}|$, $|d_{fr}|$, $|d_{rl}|$ and $|d_{rr}|$ are obtained, and a determination is made whether the absolute value $|d_{rr}|$ in the absolute values $|d_{fl}|$, $|d_{fr}|$, $|d_{rl}|$ and $|d_{rr}|$ of an error of the cosine value calculated from the estimated steering angle of the rear wheels and the velocity of the right wheels is not more than a previously set value $d_0$ (Step S10). When the absolute value $|d_{rr}|$ is not more than the set value $d_0$, the condition (the error is small) is regarded as being satisfied so that a timer for $d_{rr}$ is counted up (Step S11). When the absolute value $|d_{rr}|$ is larger than the set value $d_0$, the condition is regarded as being unsatisfied, so that the timer for $d_{rr}$ is cleared (Step S12) and the sequence goes to a next operation.

That is to say, a determination is made whether the absolute value $|d_{rl}|$ of an error of the cosine value calculated based on the estimated steering angle of the rear wheels and the velocity of the left wheel is not more than the previously set value $d_0$ (Step S13). When the absolute value $|d_{rl}|$ is not more than the set value $d_0$, the condition (the error is small) is regarded as being satisfied, so that a timer for $d_{rl}$ is counted up (Step S14). When the absolute value $|d_{rl}|$ is larger than the set value $d_0$, the condition is regarded as being unsatisfied so that the timer for $d_{rl}$ is cleared (Step S15) and the sequence goes to a next operation.

That is to say, a determination is made whether the absolute value $|d_{fr}|$ of an error of the cosine value calculated based on the estimated steering angle of the front wheels and the velocity of the right wheels is not more than the previously set value $d_0$ (Step S20). When the absolute value $|d_{fr}|$ is not more than the set value $d_0$, the condition (the error is small) is regarded as being satisfied, so that a timer for $d_{fr}$ is counted up (Step S21). When the absolute value $|d_{fr}|$ is larger than the set value $d_0$, the condition is regarded as being unsatisfied, so that the timer for $d_{fr}$ is cleared (Step S22) and the sequence goes to a next operation.

That is to say, a determination is made whether the absolute value |d_fl| of an error of the cosine value calculated based on the estimated angle of the front wheels and velocity of the right wheels is not more than the previously set value do (Step S23). When the absolute value |d_fl| is not more than the set value d_0, the condition (the error is small) is regarded as being satisfied, the timer for d_fl is counted up (Step S24). When the absolute value |d_fl| is larger than the set value d_0, the condition is regarded as being unsatisfied, so that the timer for d_fl is cleared (Step S25) and the sequence goes to next duration time processes.

A module of the flowchart in FIGS. 4 and 5 is repeated in constant cycle, and when the condition is continuously satisfied, the respective timers are kept to be counted up, but when the condition is not satisfied, the timers are cleared to 0 immediately.

A determination is made whether duration time for d_rr or duration time for d_rl is not less than predetermined time t (Step S26). When the duration time for d_rr or the duration time for d_rl is not less than the predetermined time t, the estimated angle is determined as $\alpha_{rear}$ and the operation is ended (Step S27). When the duration time for d_rr or the duration time for d_rl is shorter than the predetermined time t, a determination is made whether duration time for d_fr or duration time for d_fl is not less than the predetermined time t (Step S28). When the duration time for d_fr or the duration time for d_fl is not less than the predetermined time t, the estimated angle is determined as $\alpha_{front}$ and the operation is ended (Step S29). When the duration time for d_rr or the duration time for d_rl is shorter than the predetermined time t, the sequence returns to the step S1 so that the above operation is repeated.

The rotational ratios of the front and rear wheels $\omega_{rl}/\omega_{fl}$ and $\omega_{rr}/\omega_{fr}$ are calculated based on the rotational velocities $\omega_{fl}$, $\omega_{fr}$, $\omega_{rl}$ and $\omega_{rr}$ of the front and rear wheels on the right and left, so that the calculated rotational ratios are compared with $\cos\alpha_{fl}$, $\cos\alpha_{fr}$, $\cos\alpha_{rl}$ and $\cos\alpha_{rr}$. When the absolute values |d_fl|, |d_fr|, |d_rl| and |d_rr| of the differences between the rotational ratios and the cosine values are smaller than the previously set value d_0 for the predetermined time t, a determination is made that combinations (for example, the front wheel and left wheel in the case of d_fl) are in the steady state where the wheels do not slip. When the determination is made that one of the absolute values |d_rl| and |d_rr| shows the steady state, the value obtained in the mathematic formula 2 (rear wheels) is adopted as the steering angle estimated value, so that both |d_rl| and |d_rr| show slip. When the determination is made that any one of |d_fl| and |d_fr| shows the steady state, the value obtained in the mathematical formula 1 (front wheels) is adopted as the steering angle estimated value.

In the above example, the determination is made as to the right rear wheel, the left rear wheel, the right front wheel and the left front wheel in this order, but the order is arbitrary.

According to the steering angle estimating apparatus for vehicle of the present invention, the relational expression on which the ratio of the wheel turning radiuses in the steady state is accurately reflected is used, so that the steady state can be determined more definitely than conventional methods. Further, in the case where one wheel slips, the estimated steering angles of the four sets of the right and left front wheels, the right and left rear wheels, left front and rear wheels and the right front and rear wheels are compared, so that the wheel which slips can be specified, and the correct estimated steering angle can be selected from the other wheels.

INDUSTRIAL APPLICABILITY

Since the steering angle estimating apparatus for vehicle of the present invention can accurately determine the steady states at all the steering angles, the estimating apparatus can be applied to vehicles such as automobiles optimally. Since this estimating apparatus can estimate the steering angle as much as possible even in the case of a non-steady state, this estimating apparatus is effective for vehicle apparatuses.

The invention claimed is:

1. A steering angle estimating apparatus for vehicle that has wheel rotational velocity sensors for four wheels, respectively, and estimates a steering angle of a vehicle based on wheel rotational velocities from the wheel rotational velocity sensors, wherein a first value obtained by a first predetermined formula based on rotation velocities of left and right 2-wheels on front or rear is compared with a second value obtained by a second predetermined formula based on rotation velocities of front and rear 2-wheels on right or left side, so that slip of the four wheels is detected.

2. A steering angle estimating apparatus for vehicle according to claim 1, wherein when the two combinations of the front and rear wheels on the right and left sides match with each other, even if one of the four wheels slips, a slipped wheel is specified so that the correct steering angle can be estimated.

3. A steering angle estimating apparatus for vehicle, wherein slip of the wheel is detected by checking that when turning radiuses of the four wheels fl, fr, rl and rr are respectively designated by Rfl, Rfr, Rrl and Rff, steering angles of the front wheels fl and fr are respectively designated by $\alpha_l$ and $\alpha_r$, an axle distance of the vehicle is designated by L, a vehicle width is designated by E, a turning radius of the center of a front wheel axle is designated by Rf, a turning radius of the center of a rear wheel axle is designated by Rr, and wheel velocities of the wheels fl, fr, rl and rr, namely, left front wheel, right front wheel, left rear wheel and right rear wheel are designates by $\omega_{fl}$, $\omega_{fr}$, $\omega_{rl}$ and $\omega_{rr}$, respectively, a steering angle $\alpha$ of the center of the vehicle and the respective wheel velocities $\omega_{fl}$, $\omega_{fr}$, $\omega_{rl}$ and $\omega_{rr}$ establish the following relationships:

$$\alpha_{front} = \frac{1}{2}\arcsin\left\{\frac{4L}{E}\left(\frac{\omega_{fl}-\omega_{fr}}{\omega_{fl}+\omega_{fr}}\right)\right\} \quad \alpha_{rear} = \arctan\left\{\frac{2L}{E}\left(\frac{\omega_{rl}-\omega_{rr}}{\omega_{rl}+\omega_{rr}}\right)\right\}$$

and the front and rear wheels on the right and left sides and the steering angles $\alpha_l$ and $\alpha_r$ of the right and left wheels establish the following relationships:

$$\frac{\omega_{rl}}{\omega_{fl}} = \cos\alpha_l \quad \frac{\omega_{rr}}{\omega_{fr}} = \cos\alpha_r.$$

4. A steering angle estimating apparatus for vehicle according to claim 3, wherein after the vehicle velocity reaches a predetermined velocity, the slip is detected.

5. A steering angle estimating apparatus for vehicle according to claim 3, wherein the slip is detected in predetermined cycle.

6. An electric power steering apparatus that contains a steering angle estimating apparatus for vehicle which has wheel rotational velocity sensors for four wheels, respectively, and compares a first value obtained by a first predetermined formula based on rotation velocities of left and right 2-wheels on front or rear with a second value obtained by a second predetermined formula based on rotation velocities of front and rear 2-wheels on right or left side, so as to detect slip of the four wheels.

7. An electric power steering apparatus according to claim 6, wherein even if one of the four wheels slips, the steering angle estimating apparatus for vehicle confirms that two combinations of two of the front and rear wheels on the right and left sides so as to specify the slipped wheel and be capable of estimating the correct steering angle.

* * * * *